US012208615B2

(12) United States Patent
Arazaki

(10) Patent No.: US 12,208,615 B2
(45) Date of Patent: Jan. 28, 2025

(54) PRINTING APPARATUS AND PRINTING METHOD

(71) Applicant: SEIKO EPSON CORPORATION, Tokyo (JP)

(72) Inventor: Shinichi Arazaki, Fujimi-Machi (JP)

(73) Assignee: Seiko Epson Corporation, Tokyo (JP)

( * ) Notice: Subject to any disclaimer, the term of this patent is extended or adjusted under 35 U.S.C. 154(b) by 146 days.

(21) Appl. No.: 18/176,967

(22) Filed: Mar. 1, 2023

(65) Prior Publication Data

US 2023/0278330 A1 Sep. 7, 2023

(30) Foreign Application Priority Data

Mar. 2, 2022 (JP) ................................. 2022-031427

(51) Int. Cl.
*B41J 2/045* (2006.01)
*B41J 2/21* (2006.01)
*B41J 2/14* (2006.01)

(52) U.S. Cl.
CPC ......... *B41J 2/0451* (2013.01); *B41J 2/04581* (2013.01); *B41J 2/2114* (2013.01); *B41J 2/2142* (2013.01); *B41J 2/04593* (2013.01); *B41J 2002/14354* (2013.01); *B41J 2202/21* (2013.01)

(58) Field of Classification Search
CPC .... B41J 2/0451; B41J 2/04581; B41J 2/2114; B41J 2/2142; B41J 2/04593; B41J 2002/14354; B41J 2202/21
See application file for complete search history.

(56) References Cited

U.S. PATENT DOCUMENTS

2014/0292841 A1* 10/2014 Nagahara .............. B31D 1/021
347/2

FOREIGN PATENT DOCUMENTS

| | | | | |
|---|---|---|---|---|
| JP | 2010052159 A * | 3/2010 | .............. | B41J 29/40 |
| JP | 5266962 B2 * | 8/2013 | .............. | B41J 29/40 |
| JP | 2020-152041 A | 9/2020 | | |

* cited by examiner

*Primary Examiner* — Yaovi M Ameh
(74) *Attorney, Agent, or Firm* — WORKMAN NYDEGGER

(57) ABSTRACT

A printing apparatus includes a first printing unit including a plurality of nozzles configured to eject ink onto a medium, a second printing unit configured to perform printing on the medium using a special liquid, a defective nozzle detector configured to detect a defective nozzle among the plurality of nozzles, and a control unit configured to control the first printing unit and the second printing unit. The special liquid is a liquid rendered invisible depending on an elapsed time after printing on the medium or an environment in which a printed result on the medium is visually recognized.

5 Claims, 9 Drawing Sheets

PRINTING APPARATUS AND PRINTING METHOD

The present application is based on, and claims priority from JP Application Serial Number 2022-031427, filed Mar. 2, 2022, the disclosure of which is hereby incorporated by reference herein in its entirety.

BACKGROUND

1. Technical Field

The present disclosure relates to a printing apparatus and a printing method.

2. Related Art

A printing apparatus that performs printing on a sheet or other medium by ink ejection from nozzles may be configured to, upon detection of a defective nozzle in printing, print a mark or marker that enables identification of the occurrence of the defective nozzle on the medium together with the image to be printed, making it possible to subsequently determine whether the printed result is acceptable or not acceptable.

Further, a label producing apparatus has been disclosed that includes a printing unit configured to print a plurality of label images and position markers on a printing medium, an inspection unit configured to inspect a quality of each label image printed on the printing medium, a post-processing unit configured to perform post-processing on the label images printed on the printing medium based on the position markers, and a position marker changing unit configured to change a state of the position markers printed on the printed medium. When the inspection unit determines that a label image has an abnormality, the position marker changing unit changes the position marker corresponding to the label image that has the abnormality (JP-A-2020-152041).

When a mark or the like is printed together with the image as in the related art, even if the quality of the image is satisfactory as a result, a user may not be able to use the printed result as a product or the like or the applicable range of use may be limited due to the presence of the mark or the like. Even in a configuration in which a position marker is printed on the medium, as in JP-A-2020-152041, the portion of the position marker cannot be used as a product, making it no longer possible to use the entire medium as a product or causing a portion of the medium to be consumed for inspection purposes only.

SUMMARY

A printing apparatus includes a first printing unit including a plurality of nozzles configured to eject ink onto a medium, a second printing unit configured to perform printing on the medium using a special liquid, a defective nozzle detector configured to detect a defective nozzle among the plurality of nozzles, and a control unit configured to control the first printing unit and the second printing unit, wherein the special liquid is a liquid rendered invisible depending on an elapsed time after printing on the medium or an environment in which the printed result on the medium is visually recognized and the control unit prints a specific mark by the second printing unit using the special liquid in, of frames serving as printing unit regions of the medium, a first frame in which printing was performed by ejection of the ink with the defective nozzle included in the first printing unit, or a second frame subjected to printing by the first printing unit following the first frame.

A printing method is by a printing apparatus, the printing apparatus including a first printing unit including a plurality of nozzles configured to eject ink onto a medium and a second printing unit configured to perform printing on the medium using a special liquid, the special liquid being a liquid rendered invisible depending on an elapsed time after printing on the medium or an environment in which a printed result on the medium is visually recognized, the printing method including a first printing step for performing printing in frames serving as printing unit regions of the medium by ejecting the ink by the first printing unit, a defective nozzle detecting step for detecting a defective nozzle among the plurality of nozzles, and a second printing step for printing a specific mark by the second printing unit using the special liquid in, of the frames, a first frame in which printing was performed by ejection of the ink with the defective nozzle included in the first printing unit, or a second frame subjected to printing by the first printing unit following the first frame.

DESCRIPTION OF EXEMPLARY EMBODIMENTS

Exemplary embodiments of the present disclosure will be described below with reference to the accompanying drawings.

Note that each of the drawings is merely illustrative for describing the exemplary embodiments. Since the drawings are illustrative, proportions, shapes, and shades may not be precise or match each other, or some may be omitted.

1. Overview of Apparatus Configuration

Figure 1:
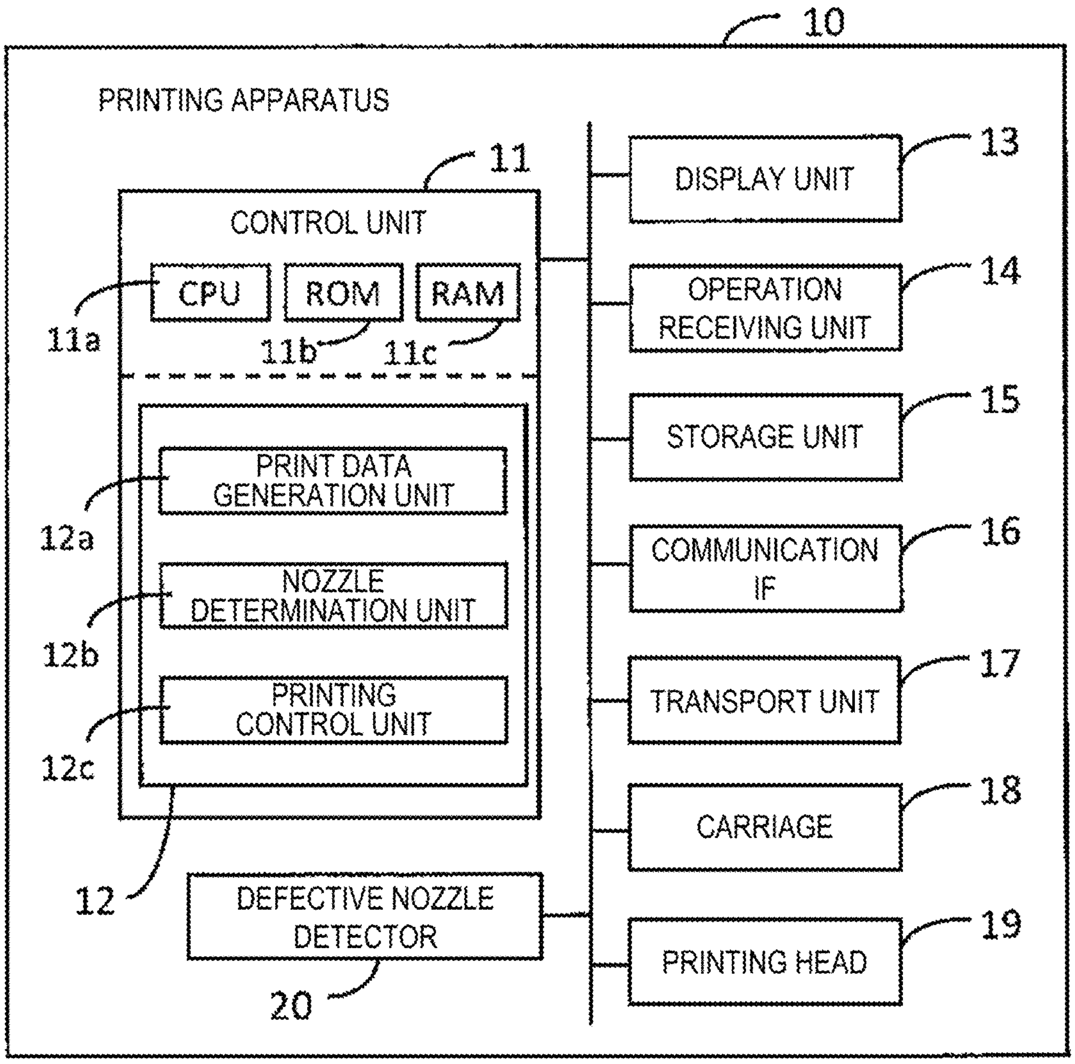
FIG. 1 is a block diagram illustrating, in a simplified manner, an apparatus configuration according to an exemplary embodiment.

FIG. 1 illustrates, in a simplified manner, a configuration of a printing apparatus 10 according to the exemplary embodiment. A printing method according to the exemplary embodiment is executed by the printing apparatus 10. The printing apparatus 10 includes a control unit 11, a display unit 13, an operation receiving unit 14, a storage unit 15, a communication IF 16, a transport unit 17, a carriage 18, a printing head 19, a defective nozzle detector 20, and the like. IF is an abbreviation for interface. The control unit 11 includes, as a processor, one or more integrated circuits (ICs) including a central processing unit (CPU) 11*a*, a read-only memory (ROM) 11*b*, a random-access memory (RAM) 11*c*, and the like, another non-volatile memory, and the like.

In the control unit 11, the processor, that is, the CPU 11*a*, executes arithmetic processing in accordance with a program 12 stored in the ROM 11*b*, other memory, or the like, using the RAM 11*c* or the like as a work area, to realize various functions such as a print data generation unit 12*a*, a nozzle determination unit 12*b*, and a printing control unit 12*c*. The processor is not limited to the single CPU, and a configuration may be adopted in which the processing is performed by a hardware circuit such as a plurality of CPUs, an application-specific integrated circuit (ASIC), or the like, or a configuration may be adopted in which the CPU and the hardware circuit work in concert to perform the processing.

The display unit 13 is a unit that displays visual information, and is configured by, for example, a liquid crystal display or an organic electroluminescent (EL) display. The display unit 13 may include a display and a driving circuit for driving the display. The operation receiving unit 14 is a unit that receives an input by a user, and is realized by, for example, a physical button, a touch panel, a mouse, or a keyboard. Of course, the touch panel may be realized as a function of the display unit 13. The display unit 13 and the operation receiving unit 14 may be collectively referred to as an operation panel of the printing apparatus 10. The display unit 13 and the operation receiving unit 14 may be part of the configuration of the printing apparatus 10, or may be peripheral devices externally coupled to the printing apparatus 10.

The storage unit 15 is, for example, a hard disk drive, a solid-state drive, or other memory storage unit. A portion of the memory included in the control unit 11 may be regarded as the storage unit 15. The storage unit 15 may be regarded as a portion of the control unit 11. The storage unit 15 stores information related to defective nozzles in the exemplary embodiment.

The communication IF 16 is a generic term for one or a plurality of IFs used by the printing apparatus 10 to execute communication with an external device in a wired or wireless manner, in accordance with a prescribed communication protocol including a known communication standard. The external device may be, for example, a personal computer, a server, a smartphone, or a tablet-type terminal.

The transport unit 17 is a unit that transports a medium 30 in a predetermined transport direction under the control of the control unit 11. The transport unit 17 includes, for example, a roller that rotates and transports the medium 30 and a motor as a power source for rotation. Further, the transport unit 17 may be a mechanism that transports the medium 30 with the medium 30 mounted onto a motorized belt or pallet. The medium 30 is, for example, a sheet, but may be any medium that can be subjected to printing by liquid, and may be a material other than paper, such as film or fabric. Of course, the medium 30 may be a label sheet composed of a substrate and a label releasably adhered to the substrate.

The carriage 18 is a unit that performs reciprocation in a predetermined direction by the power of a carriage motor (not illustrated) under the control of the control unit 11. The printing head 19 is mounted onto the carriage 18. Accordingly, the printing head 19 moves with the carriage 18.

The printing head 19 is a unit that performs printing, under the control of the control unit 11, by ejecting liquid from a nozzle 21 onto the medium 30, using an inkjet method. The liquid is primarily an ink for coloring, but in this exemplary embodiment, the printing head 19 can also eject a "special liquid". A liquid droplet ejected by the nozzle 21 is referred to as a dot.

The special liquid is a liquid rendered invisible depending on an elapsed time after printing on the medium 30 or an environment in which the printed result on the medium 30 is visually recognized. As a specific example, the special liquid is an ultraviolet (UV) light-emitting ink that is transparent and visually recognizably emits light when irradiated with ultraviolet light. The UV light-emitting ink is not visible unless irradiated with ultraviolet light by a so-called black light or the like, and therefore can be said to be a liquid rendered invisible depending on the environment in which the printed result of the medium 30 is visually recognized.

The special liquid may be an ink that disappears and is no longer visible when a predetermined amount of time or longer elapses after printing. Further, the special liquid may be an ink that disappears and is no longer visible when heat of a predetermined temperature or higher is applied after printing. Special liquids that are rendered invisible depending on the environment, such as the presence or absence of ultraviolet irradiation or the presence or absence of heating, or depending on an elapsed time are known.

In the following, unless otherwise specified, the term "ink" refers to ink for coloring the medium 30 with a color material, and does not refer to the special liquid. In the following, description will continue under the assumption that the special liquid is the UV light-emitting ink.

The defective nozzle detector 20 is a unit that can execute defective nozzle detection processing of detecting a "defective nozzle" among a plurality of the nozzles 21 of the printing head 19 for ejecting ink. In the field of printing apparatuses, it is known that thickening of the ink, mixture of air bubbles, and deposition of paper powder and dust in a nozzle or in an internal space in communication with the nozzle causes clogging of the nozzle, resulting in poor ink ejection. A nozzle that exhibits poor ejection compared to a nozzle that exhibits normal ejection is referred to as a defective nozzle. The defective nozzle may be referred to as an abnormal nozzle. The defective nozzle causes a state in which ink that should be ejected onto the medium 30 is not ejected, that is, a so-called dot omission.

Various methods can be employed as the defective nozzle detection processing, including known methods, and thus the method is not particularly limited. For example, the printing head 19 is moved by the carriage 18 to a predetermined inspection position away from the medium 30, each nozzle 21 is caused to perform an ink ejection operation, and whether a dot is actually ejected from each nozzle 21 is detected by an optical sensor that is the defective nozzle detector 20. Thus, the nozzle 21 that failed to eject a dot can be detected as a defective nozzle.

Further, the defective nozzle detector 20 can also apply a predetermined drive signal to an actuator of the nozzle 21 to generate residual vibration in a pressure chamber, and detect the defective nozzle based on the residual vibration. In the printing head 19, each nozzle 21 is provided with an actuator based on a piezoelectric element, and a pressure chamber that is deformed by the actuator, causing the nozzle 21 to eject ink. Although details are omitted, the printing head 19 outputs, to the actuator of the nozzle 21, a drive signal for generating residual vibration in the pressure chamber for inspection. The residual vibration is to the extent that ink is not ejected from the nozzle 21. The defective nozzle detector 20 detects the residual vibration after a pressure change occurs in the pressure chamber due to this drive signal as a change in an electromotive force of the piezoelectric element constituting the actuator. Then, the defective nozzle detector 20 determines whether the nozzle 21 being inspected is normal or defective by comparing a state of this residual vibration, such as frequency, cycle, or amplitude, for example, with a reference value set in advance for making a normal or defective determination.

The printing apparatus 10 may be realized by a single printer, or may be realized by a system including a plurality of devices communicatively coupled. For example, the printing apparatus 10 may be a system that includes an information processing device that serves as the control unit 11 and a printer that includes the transport unit 17, the carriage 18, the printing head 19, and the defective nozzle detector 20 and executes printing under the control of the information processing device. In this case, the information processing device can be identified as a printing control apparatus, an image processing apparatus, or the like.

Figure 2:
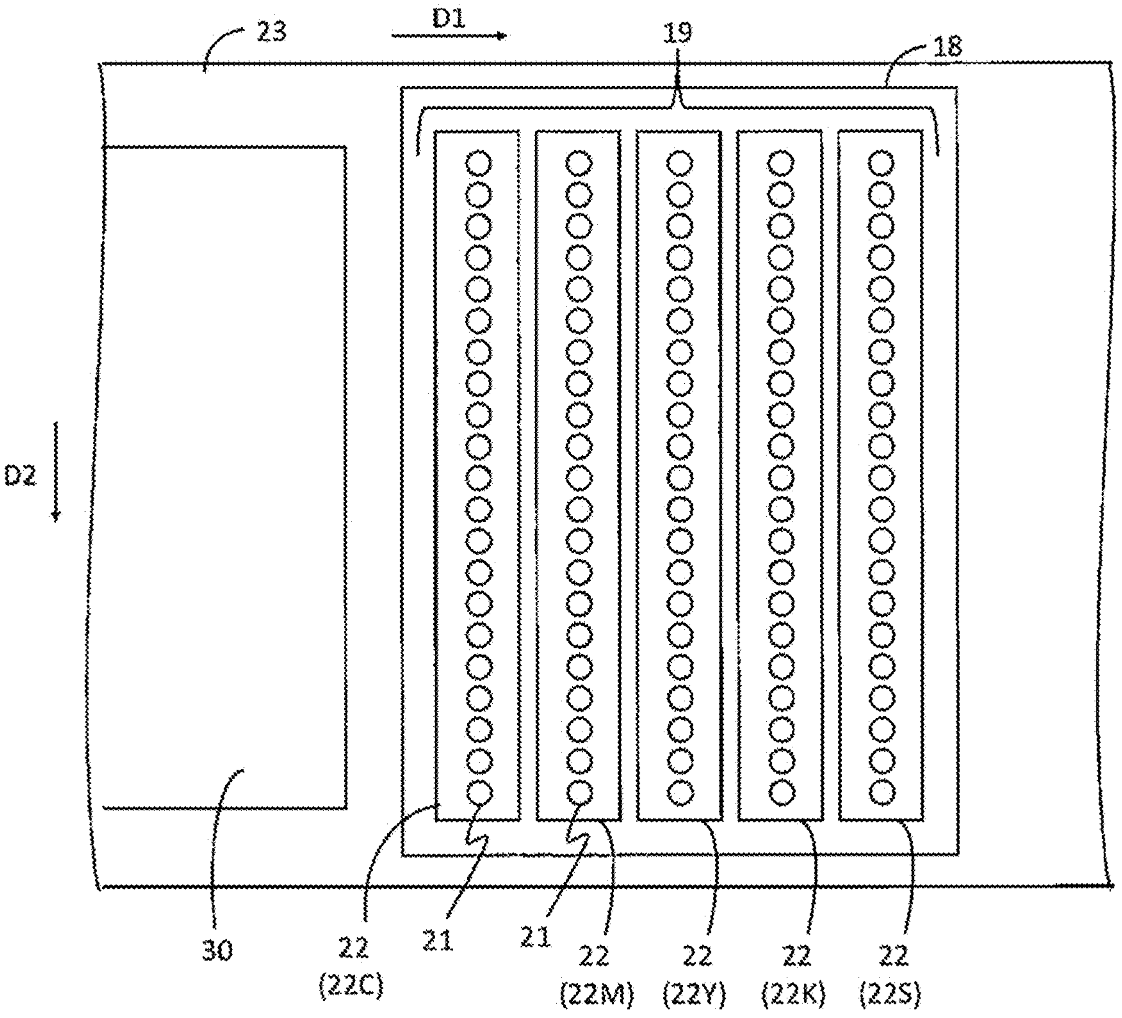
FIG. 2 is a drawing illustrating, in a simplified manner, a relationship between a medium and a printing head, as viewed from above.

FIG. 2 illustrates, in a simplified manner, a relationship between the medium 30, the printing head 19, and the like, as viewed from above. FIG. 2 illustrates two orthogonal directions D1, D2. The direction D1 will be referred to as the transport direction D1 of the medium 30 by the transport unit 17, and the direction D2 will be referred to as the width direction D2. Upstream and downstream in the transport direction are simply denoted using the terms upstream and downstream. In the example illustrated in FIG. 2, the medium 30 is transported from upstream to downstream on a platen 23 by the transport unit 17. The platen 23 is a platform that supports the medium 30 and can be described as a portion of a transport path of the medium 30.

In FIG. 2, individual circles represent the individual nozzles 21. The printing head 19 prints an image on the medium 30 by ejecting or not ejecting dots of ink from each nozzle 21 based on print data generated by the control unit 11 for printing an image. In the printing head 19, the application of drive signals to the actuators of each nozzle 21 is controlled based on print data, making it possible to select dot ejection (dot-on) or non-ejection (dot-off) for each nozzle 21. The printing head 19 is capable of ejecting various colors of ink, such as cyan (C), magenta (M), yellow (Y), and black (K), for example, and the special liquid.

The printing head 19 includes nozzle groups 22 for different liquid types. FIG. 2 illustrates an example of an array of the nozzles 21 in the printing head 19. The nozzle group 22 composed of a plurality of the nozzles 21 that eject the C ink is a nozzle group 22C. Similarly, the nozzle group 22 composed of a plurality of the nozzles 21 that eject the M ink is a nozzle group 22M, the nozzle group 22 composed of a plurality of the nozzles 21 that eject the Y ink is a nozzle group 22Y, and the nozzle group 22 composed of a plurality of the nozzles 21 that eject the K ink is a nozzle group 22K. Further, the nozzle group 22 composed of a plurality of the nozzles 21 that eject the special ink is a nozzle group 22S. The nozzle groups 22C, 22M, 22Y, 22K of the printing head 19 correspond to a specific example of a "first printing unit" including a plurality of the nozzles 21 for ejecting ink onto the medium 30. On the other hand, the nozzle group 22S of the printing head 19 corresponds to a specific example of a "second printing unit" capable of printing on the medium 30 using the special liquid. In the example of FIG. 2, the second printing unit is positioned downstream of the first printing unit.

In the example illustrated in FIG. 2, each of the nozzle groups 22 is formed by a plurality of the nozzles 21 arranged across a range capable of covering a medium width that is a length of the medium 30 in the width direction D2. The plurality of nozzle groups 22C, 22M, 22Y, 22K, 22S are arranged at the same positions in the width direction D2, and are aligned in the transport direction D1. One nozzle group 22 is formed by a plurality of the nozzles 21 being aligned with a constant or substantially constant nozzle pitch, which is an interval between the nozzles 21 in the transport direction D2. In FIG. 2, for the sake of simplicity, one nozzle group 22 is a single nozzle row in which a plurality of the nozzles 21 are aligned in the width direction D2. Of course, one nozzle group 22 may be formed by a plurality of nozzle rows, or the direction in which the nozzles 21 forming the nozzle group 22 is aligned may be a direction oblique to the width direction D2. Further, the nozzle group 22 may also be referred to as the nozzle row 22 regardless of the arrangement of the nozzles 21 forming the nozzle group 22.

In the example of FIG. 2, the carriage 18 can reciprocate parallel to the transport direction D1 at a predetermined height above the platen 23. In a state in which the medium 30 is stationary on the platen 23, the control unit 11 reciprocates the carriage 18 parallel to the transport direction D1, and ejects ink from each nozzle group 22C, 22M, 22Y, 22K of the printing head 19 during movement of the carriage 18. The ink ejection by the printing head 19 based on the print data associated with the movement of the carriage 18 is referred to as a "pass". When the movement of the carriage 18 from upstream to downstream is an outward movement and the movement of the carriage 18 from downstream to upstream is a return movement, the ink ejection associated with the outward movement is an outward pass and the ink ejection associated with the return movement is a return pass. Printing performed across both the outward pass and the return pass is referred to as bi-directional printing, and printing performed on either the outward pass or the return pass is referred to as uni-directional printing. In this exemplary embodiment, the printing can be either bi-directional printing or uni-directional printing.

The control unit 11 performs printing in a "frame" that is a print unit region of the medium 30 by controlling the carriage 18 and printing head 19 and executing one or more passes in a state in which the medium 30 is stationary on the platen 23. The frame is a region of a predetermined size. The control unit 11 performs printing in the one frame, subsequently causes transport of the transport unit 17 for a distance corresponding to one frame, and then performs printing in the next frame. By repeating this, the control unit 11 can perform printing continuously in a plurality of frames of the medium 30.

The nozzle group 22S is used for printing a "specific mark" indicating that printing was performed by ink ejection with a defective nozzle included in the first printing unit, as described below. The specific mark may be referred to by any name, but hereinafter will be referred to as an "index". In the example illustrated in FIG. 2, the nozzle group 22S as the second printing unit has a length capable of covering the medium width in the width direction D2, similarly to the nozzle groups 22C, 22M, 22Y, 22K corresponding to the ink. However, the nozzle group 22S need only be a unit that can print the index with the special liquid, and thus, in the width direction D2, need not have a length or a number of nozzles equivalent to those of the nozzle groups 22 corresponding to the ink.

Note that the carriage 18 may be movable in a direction parallel to the transport direction D1 and in a direction parallel to the width direction D2. That is, in the printing of a single frame, the control unit 11 may execute each pass while changing the positions of the carriage 18 and the medium 30 in the width direction D2 on a per pass basis.

Alternatively, a configuration may be adopted in which the transport direction of the medium 30 by the transport unit 17 is a direction parallel to the direction D2 in FIG. 2, and the control unit 11 performs printing by alternately repeating transport of the medium 30 and movement parallel to the direction D1 of the printing head 19 by the carriage 18.

Alternatively, the printing apparatus 10 may have a configuration that does not include the carriage 18. That is, a configuration may be adopted in which, in the configuration of FIG. 2, the carriage 18 is omitted, the printing head 19 is fixed above the platen 23, and printing is performed by the ink ejected from the printing head 19 when the medium 30 transported in the transport direction D1 by the transport unit 17 passes downstream, below the printing head 19. In this way, a configuration in which the printing head 19 does not move may be substantially the same as a configuration in which one frame is printed in a single pass.

2. First Exemplary Embodiment

A first exemplary embodiment will now be described.

Figure 3:
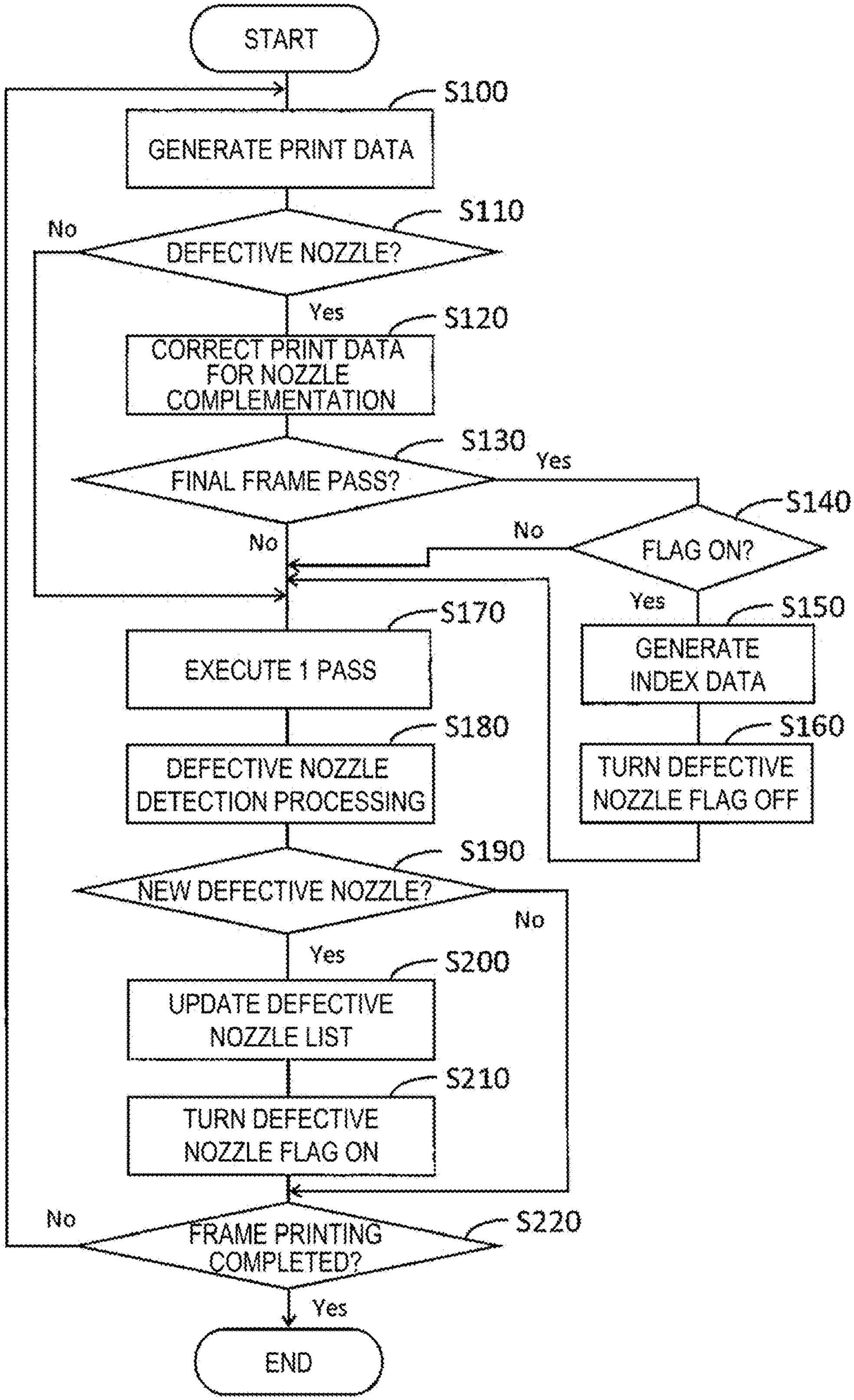
FIG. 3 is a flowchart illustrating a portion of printing control processing.

FIG. 3 illustrates, by a flowchart, a portion of printing control processing executed by the control unit 11 in accordance with the program 12. Note that the order of execution of each step in the flowchart need not be limited to the order described in the flowchart. Further, the roles of each functional unit in the control unit 11, such as the print data generation unit 12*a*, the nozzle determination unit 12*b*, and the printing control unit 12*c*, need not be construed as limited to those in the examples described below. The control unit 11 executes N passes per frame of the medium 30 to complete printing, and repeatedly performs such printing for each frame for a plurality of frames. N is an integer equal to or greater than 1. Here, N=4 is used as an example. The flowchart of FIG. 3 is processing for one frame, and the current target frame is referred to as "target frame".

In step S100, the print data generation unit 12*a* of the control unit 11 generates the print data required for execution of the pass of the target frame. Herein, it is assumed that the image data serving as a generation source of the print data and representing a desired image of the user is specified through an operation of the operation receiving unit 14 by the user, for example, and that the print data generation unit 12*a* already acquired this image data from a storage location of the image data, such as the storage unit 15 or memory inside or outside the printing apparatus 10. Or, it is assumed that the print data generation unit 12*a* received and acquired the image data transmitted from an external device through the communication IF 16.

The print data generation unit 12*a* executes each processing, such as resolution conversion processing, color conversion processing, and halftone processing, on the image data, as necessary, and generates the print data for one frame. The print data is data that defines dot-on or dot-off for each pixel and for each CMYK ink. As is known, the control unit 11 is capable of ejecting dots of different sizes from the nozzle 21 by varying a waveform of the drive signal applied to the actuator for each nozzle 21 of the printing head 19, or the like. For example, the nozzle 21 is capable of ejecting dots of three types of sizes referred to as a large dot, a medium dot, and a small dot. The size of the dot refers to an ink amount per dot or a dot diameter. Of course, the sizes are such that large dot>medium dot>small dot. According to such an example, the ink dot-on information in the print data is also information indicating one of large dot-on, medium dot-on, or small dot-on.

Given that N=4 as described above, the print data generation unit 12*a* disassembles the print data of one frame, associating print data with each of four passes. That is, each pixel constituting the print data of one frame is associated with one of the first to fourth passes. This results in one frame's worth of print data, with print data per pass generated for use in each of the four passes. Here, a case in which each raster line constituting one frame is printed in N passes is assumed. A raster line is a line that faces a direction intersecting an alignment direction of the nozzles 21 and, according to the example of FIG. 2, is a pixel row of pixels aligned in the transport direction D1 intersecting the width direction D2. That is, the printing of each raster line in one frame is completed in N passes. The printed result of such a pixel row on the medium 30 may also be referred to as a raster line.

In the example of FIG. 2, when the movement of the carriage 18 is reciprocation parallel to the transport direction D1 only, the ink of one color of one raster line is printed by one nozzle 21 that ejects ink of that one color. On the other hand, in the example of FIG. 2, when a configuration is adopted in which the carriage 18 is also capable of reciprocation parallel to the width direction D2 in addition to the transport direction D1 and the positions of the medium 30 and the printing head 19 in the width direction D2 differ for each pass, the ink of one color of one raster line is printed by a plurality of the nozzles 21 that eject ink of that one color.

Figure 5:
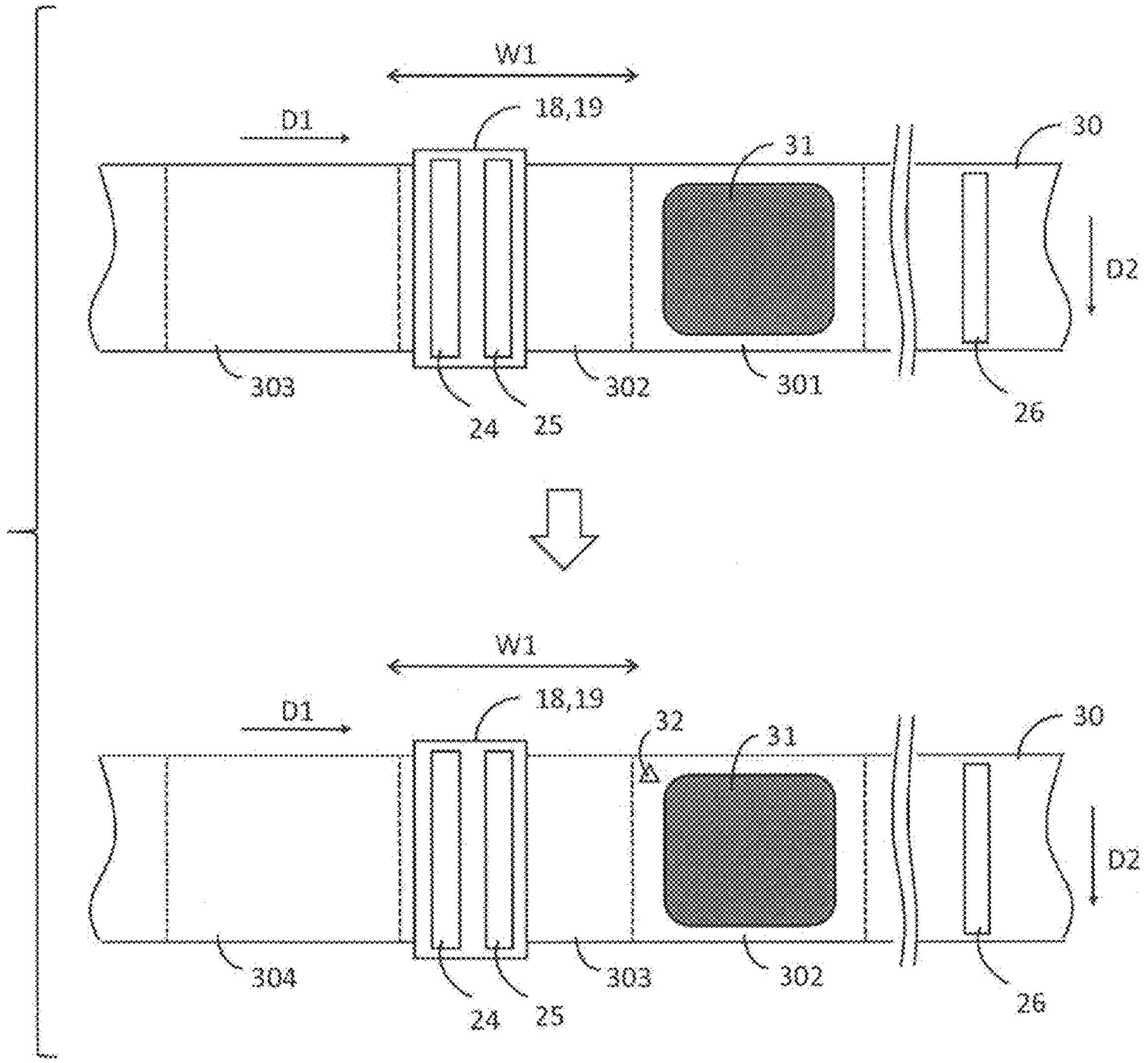
FIG. 5 is a drawing for explaining a specific example of a first exemplary embodiment.

FIG. 5 is a drawing for describing a specific example of the first exemplary embodiment, and illustrates the medium 30, the printing head 19, and the like from a viewpoint similar to that of FIG. 2. In FIG. 5, the carriage 18 and the printing head 19 are integrally illustrated, and the platen 23 is omitted. Further, the nozzle groups 22C, 22M, 22Y, 22K corresponding to the first printing unit are collectively indicated as a first printing unit 24, and the nozzle group 22S is indicated as a second printing unit 25.

In the example illustrated in FIG. 5, the medium 30 is roll paper long in the transport direction D1, and the medium 30 is divided into a plurality of frames 301, 302, 303, 304 . . . in the transport direction D1. Each frame 301, 302, 303, 304 . . . may or may not be divided in a manner visually recognizable by the user. According to the upper portion of FIG. 5, an image 31 of some kind has already been printed in the frame 301 adjacently downstream of the frame 302 by N passes based on the print data. Therefore, the upper portion of FIG. 5 can be described as illustrating a scenario in which the flowchart of FIG. 3 is about to start, with the frame 302 as the target frame. In the scenarios respectively illustrated in the upper portion and the lower portion in FIG. 5, the transport of the medium 30 is stopped.

In FIG. 5, a movable range of the carriage 18 parallel to the transport direction D1 is indicated as a movement range W1. The movement range W1 is a distance substantially corresponding to one frame. That is, in the example of FIG. 5, the movement range W1 is substantially limited to the target frame, and the printing head 19 cannot perform printing in a frame other than the target frame. Additionally, in the example illustrated in FIG. 5, an irradiation unit 26 is arranged on the transport path of the medium 30, in a predetermined position at a distance downstream of the printing head 19. The irradiation unit 26 irradiates, with ultraviolet light, a region of the medium 30 where the index is configured to be printed. The irradiation unit 26 may be movable under the control of the control unit 11, or may not be movable.

In step S110, the nozzle determination unit 12*b* refers to a "defective nozzle list" and determines whether a defective nozzle is present in the printing head 19. Then, if a defective nozzle is not present, the determination "No" is made and the processing proceeds to step S170. On the other hand, if one or more defective nozzles are present, the determination "Yes" is made and the processing proceeds to step S120. The defective nozzle list is information stored in the storage unit 15, and is a list in which the prior results of the defective nozzle detection processing by the defective nozzle detector 20 are registered. Each nozzle 21 of the first printing unit 24 included in the printing head 19 is identified by an ink color and a nozzle number. The nozzle number is, for example, a number assigned sequentially to the position of each nozzle 21 in the width direction D2. The information of the nozzle 21 detected as a defective nozzle is registered in the defective nozzle list as, for example, "C Nozzle No. 50". Therefore, if one or more defective nozzles are registered in the defective nozzle list, the nozzle determination unit 12*b* makes the determination "Yes" in step S110. A defective nozzle detected when a frame downstream of the current target frame was the target frame is also registered in the defective nozzle list.

In step S120, the print data generation unit 12*a* corrects the print data for nozzle complementation. Nozzle complementation is processing of complementing a dot omission caused by a defective nozzle with ink ejection from the nozzle 21 in the vicinity of the defective nozzle, thereby making the dot omission on the medium 30 less recognizable. Nozzle complementation is also referred to as vicinity complementation. The nozzle 21 in the vicinity of the defective nozzle is typically the nozzle 21 that ejects ink of the same color as the defective nozzle, and is adjacent to the defective nozzle in the width direction D2. Further, the nozzle 21 that ejects ink of a color different than that of the defective nozzle and corresponds or is adjacent to the position of the defective nozzle in the width direction D2 may also be included as the nozzle 21 in the vicinity of the defective nozzle.

The print data generation unit 12*a* performs correction for nozzle complementation by targeting the print data generated in step S100 for use in a pass to be executed across the target frame. For example, if a first pass is about to be executed across the target frame, the print data for printing in the target frame in the first pass is corrected. Specifically, of the pixels constituting the print data, for a pixel in a position to be printed by the nozzle 21 in the vicinity of a defective nozzle (hereinafter referred to as "neighboring pixel"), the dot specified for the neighboring pixel is replaced with a dot of a larger size. For example, if dot-off is specified for a neighboring pixel, the dot-off is replaced with small dot-on. Further, for example, if small dot-on is specified for a neighboring pixel, the small dot-on is replaced with medium dot-on or large dot-on. The print data generation unit 12*a* executes such correction of a neighboring pixel for each of the defective nozzles registered in the defective nozzle list.

In step S130, the print data generation unit 12*a* branches the processing according to whether the pass to be executed is the final pass across the target frame. When N=4 as described above, the fourth pass across the target frame is the final pass. Therefore, if the passes up to the third pass across the target frame are completed and the fourth pass is about to be executed, the determination "Yes" is made in step S130, and the processing proceeds to step S140. On the other hand, if the passes up to the third pass across the target frame are not completed, the determination "No" is made in step S130, and the processing proceeds to step S170. If N=1, step S130 is invariably "Yes".

In step S140, the print data generation unit 12*a* branches the processing in accordance with whether a "defective nozzle flag" is on or off. Although details will be described below, the defective nozzle flag is a flag that is switched from off to on in step S210 when a new defective nozzle is detected, and is also stored in the storage unit 15. When the defective nozzle flag is on, the print data generation unit 12*a* proceeds from "Yes" in step S140 through step S150 and to step S170. On the other hand, when the defective nozzle flag is off, the print data generation unit 12*a* proceeds from "No" in step S140 to step S170.

In step S150, the print data generation unit 12*a* generates index data and, in step S160, switches the defective nozzle flag from on to off and proceeds to step S170. The index data is print data for printing an index on the medium 30 by the special liquid. The index may be a mark or a marker of any shape or design. In the example in FIG. 5, an index 32 is a triangular mark, and thus the index data is, for example, data representing such an index 32.

In step S170, the printing control unit 12*c* controls the carriage 18 and the printing head 19, executes one pass, and prints the image by the ink.

In step S170, following the "No" in step S110, the printing control unit 12*c* executes a pass to be executed across the target frame at that time, that is, one of the first to N-th passes, based on the print data corresponding to the pass. In the pass executed in step S170 following the "No" in step S110, ink is ejected based on the print data not corrected for nozzle complementation.

In step S170, following the "No" in step S130, the printing control unit 12*c* executes a pass to be executed across the target frame at that time, that is, one of the first to N-th passes, based on the print data corresponding to the pass and corrected in step S120.

In step S170, following the "No" in step S140, the printing control unit 12*c* executes the final pass across the target frame, that is, the N-th pass, based on the print data corresponding to the N-th pass and corrected in step S120.

In step S170, following the "No" in step S150, the printing control unit 12*c* executes the N-th pass across the target frame, based on the print data corresponding to the N-th pass and corrected in step S120. Furthermore, in this N-th pass, the printing control unit 12*c* also ejects the special liquid, that is, prints the index based on the index data by the second printing unit 25. Note that the timing of switching the defective nozzle flag from on to off after the index data is generated in step S150 may coincide with the timing of completion of the pass in step S170 following step S150 rather than the timing of step S160 illustrated in FIG. 3.

After execution of one pass by step S170, in step S180, the nozzle determination unit 12*b* causes the defective nozzle detector 20 to execute the defective nozzle detection processing targeting the first printing unit 24. That is, in the exemplary embodiment, the defective nozzle detection processing is performed every time a pass is completed.

In step S190, the nozzle determination unit 12*b* branches the processing according to whether a new defective nozzle is detected by step S180. A new defective nozzle refers to the nozzle 21 not detected as a defective nozzle before execution of the most recent step S180, but detected as a defective nozzle by the defective nozzle detection processing of the most recent step S180. The nozzle 21 detected as a defective nozzle before the most recent step S180 and also detected as a defective nozzle in the most recent step S180 is not a new defective nozzle. If the nozzle determination unit 12*b* detects a new defective nozzle by step S180, the processing proceeds from the determination of "Yes" in step S190 to step S200. If a new defective nozzle is not detected in step S180, the processing proceeds from the determination of "No" in step S190 to step S220.

In step S200, the nozzle determination unit 12*b* newly registers the new defective nozzle detected by step S180 in the defective nozzle list to update the defective nozzle list. The new defective nozzle registered in the defective nozzle list is subsequently subjected to nozzle complementation, similarly to the defective nozzles already registered.

In step S210, the nozzle determination unit 12*b* switches the defective nozzle flag from off to on, and proceeds to step S220. When the defective nozzle flag is already on at the time point of step S210, the on state need only be maintained.

In step S220, the print data generation unit 12*a* determines whether the printing of the image in the target frame is completed. If the pass executed in the most recent step S170 is the final pass across the target frame, that is, the N-th pass, the printing of the image in the target frame can be regarded as completed, and thus the print data generation unit 12*a* makes the determination "Yes" in step S220 and ends the flowchart in FIG. 3. On the other hand, if the pass executed in the most recent step S170 is not the N-th pass across the target frame, the determination "No" is made in step S220, step S100 and subsequent steps are repeated, and the next pass across the target frame is performed. In step S100 following the "No" in step S220, when the print data for each pass used for performing printing in the target frame is already generated, there is no need to generate print data again, and therefore step S100 can be substantially skipped and a determination need only be made in step S110.

The lower portion of FIG. 5 illustrates a state in which the flowchart of FIG. 3 with the frame 302 as the target frame is completed, and the transport unit 17 completed transport of the medium 30 by an amount equivalent to one frame. Such a lower portion of FIG. 5 can also be described as illustrating a time point at which the flowchart of FIG. 3 is about to start afresh with the frame 303 adjacently upstream of the frame 302 as the target frame. According to the lower portion of FIG. 5, the image 31 and the index 32 are printed in the frame 302. The index 32 is printed with UV light-emitting ink as the special liquid, and therefore is not visually recognized by the user in the state of FIG. 5.

As understood from the description above, the index 32 being printed in the frame 302 means that, in the flowchart of FIG. 3 with the frame 302 as the target frame, a new defective nozzle was detected before execution of the final pass across the frame 302. That is, in a state in which a new defective nozzle is present, at least one pass of the first to N-th passes of the frame 302 was executed without nozzle complementation for the defective nozzle. Therefore, the index 32 is printed in the frame 302 along with the image in the N-th pass across the frame 302 in the sense of indicating the possibility that dot omission has occurred. According to such FIGS. 3 and 5, the control unit 11 may be described as printing the specific mark by the second printing unit 25 using the special liquid in, of the frames of the medium 30, a "first frame" in which printing was performed by ejection of the ink with the defective nozzle included in the first printing unit 24. According to the examples described above, the frame 302 corresponds to the first frame.

Figure 4:
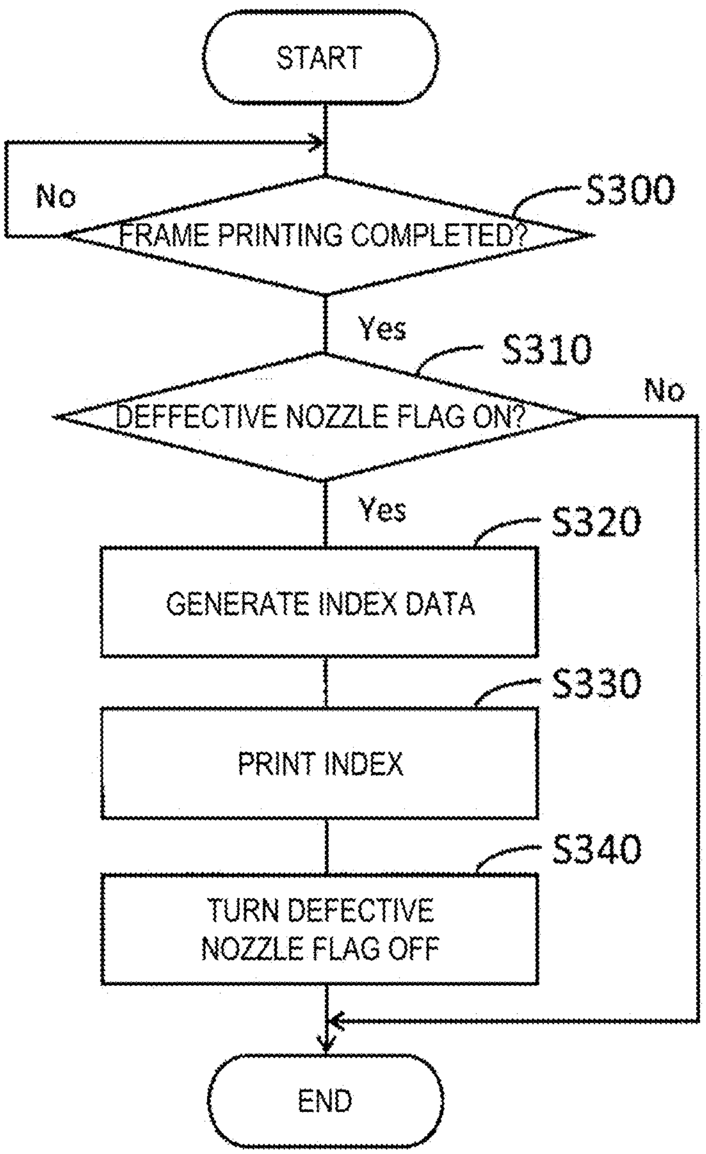
FIG. 4 is a flowchart illustrating another portion of the printing control processing.

FIG. 4 illustrates, by a flowchart, a portion of the printing control processing not represented in FIG. 3. FIG. 4 explains a scenario with the assumption that the flowchart of FIG. 3 with the frame 302 as the target frame has ended. That is, the "Yes" in step S300 of FIG. 4 is the same as the "Yes" in step S220 when the frame 302 was the target frame.

After the "Yes" in step S300, in step S310, the print data generation unit 12*a* branches the processing in accordance with whether the defective nozzle flag is on or off. The print data generation unit 12*a* proceeds from "Yes" to step S320 when the defective nozzle flag is on, and makes the determination "No" in step S310 to end the flowchart in FIG. 4 when the defective nozzle flag is off.

The defective nozzle flag being on at the timing of step S310 indicates that, in the flowchart of FIG. 3 when the frame 302 was the target frame, a new defective nozzle was detected in step S180 after the N-th pass across the frame 302, and the defective nozzle flag was switched to on in step S210. In this case, the index was not printed during the printing in the frame 302. Thus, in step S320, the print data generation unit 12*a* generates the index data.

In step S330, the printing control unit 12*c* controls the carriage 18 and the printing head 19, executes one pass, and ejects the special liquid by the second printing unit 25 based on the index data generated in step S320, that is, prints the index. Then, the print data generation unit 12*a* switches the defective nozzle flag from on to off in step S340 to end the flowchart of FIG. 4.

Note that the "Yes" of step S220 when the frame 302 was the target frame, that is, the "Yes" in step S300, also serves as a start condition of the flowchart of FIG. 3 in which the next frame 303 is the target frame. Accordingly, the flowchart of FIG. 4 is processing performed in parallel with the flowchart of FIG. 3 in which the frame 303 is the target frame, and the embodiment of step S330 is part of the pass of step S170 for the frame 303.

Specifically, when the flowchart of FIG. 3 with the frame 302 as the target frame is ended with the defective nozzle flag on, in the following flowchart of FIG. 3 with the frame 303 as the target frame, the printing control unit 12*c* performs ink ejection by the first printing unit 24 and special liquid ejection by the second printing unit 25 in the first pass across the target frame, printing the image and the index in the frame 303. The defective nozzle flag is switched to OFF in step S340 immediately after such a step S170 in which the index printing of step S330 was also performed, and thus the defective nozzle flag is off at the stage of the first step S180 in the flowchart of FIG. 3.

Figure 6:
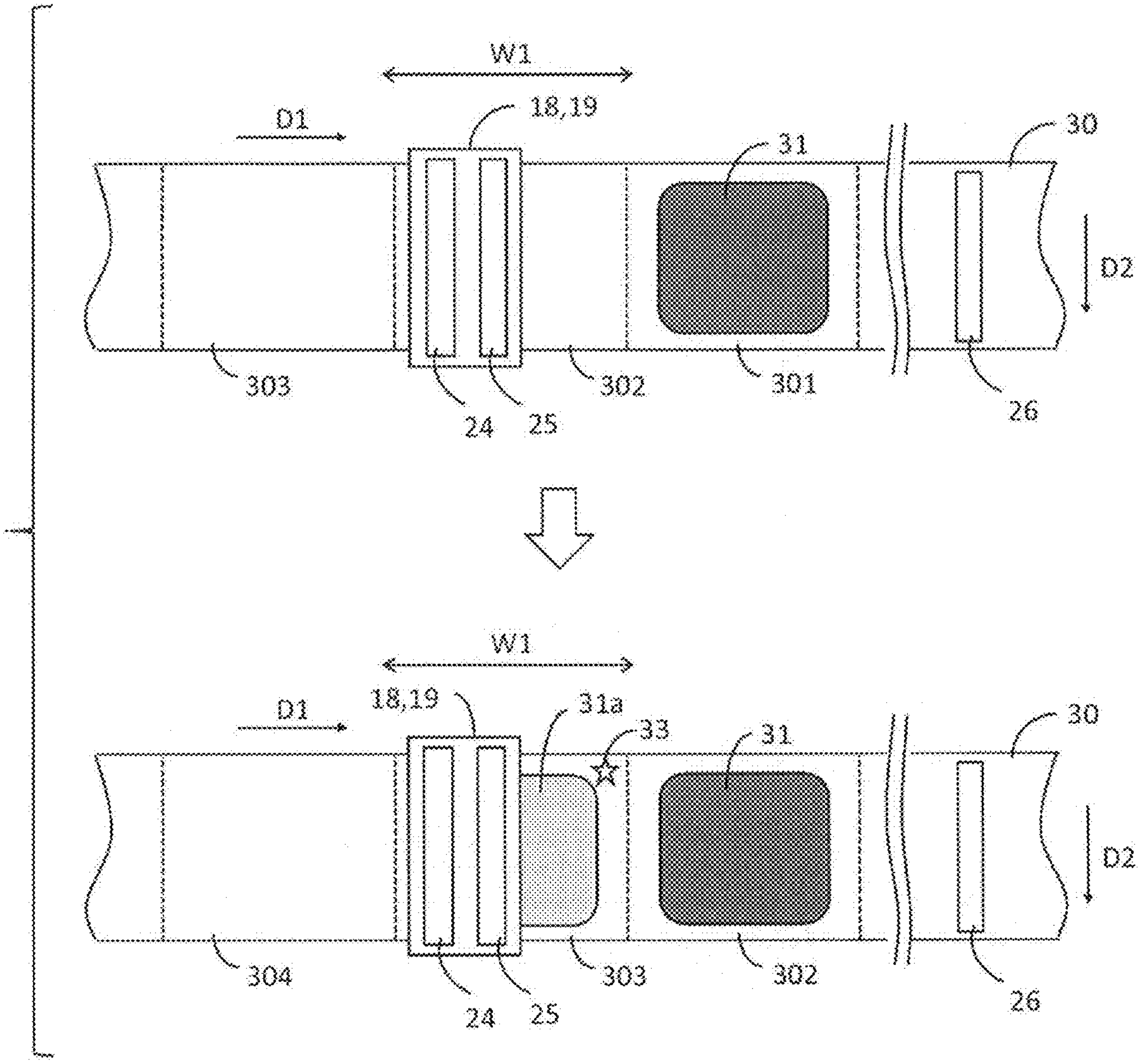
FIG. 6 is a drawing for explaining another specific example of the first exemplary embodiment.

FIG. 6 is a drawing for explaining a specific example of the first exemplary embodiment. The view in FIG. 6 is the same as the view in FIG. 5. FIG. 6 explains only points that differ from FIG. 5. The lower portion in FIG. 6 illustrates a state in which at least one pass has been completed in the flowchart of FIG. 3 with the frame 303 as the target frame. According to the lower portion in FIG. 6, unlike the lower portion in FIG. 5, the index 32 is not printed in the frame 302 for which printing is completed, and instead an index 33 is printed in the frame 303. That is, in the example illustrated in FIG. 6, because the flowchart of FIG. 3 in which the frame 302 is the target frame ends with the defective nozzle flag being on, the index 33 is printed in the frame 303 along with an image 31*a* by step S170 concurrently carried out with step S330 in FIG. 4. The image 31*a* may be regarded as in a state before reaching the image 31 obtained upon completion of N passes.

The index 33 is an index printed based on the index data generated in step S320. That is, in a state in which a new defective nozzle is present, the N-th pass of the frame 302 was executed without nozzle complementation for the defective nozzle. Therefore, in the sense of indicating the possibility of the occurrence of dot omission, the index 33 is printed in the frame 303 following the frame 302. According to such FIGS. 4 and 6, the control unit 11 may be described as printing the specific mark by the second printing unit 25 using the special liquid in a "second frame" subjected to printing by the first printing unit 24 following the first frame in which printing was performed by ejection of the ink with a defective nozzle included in the first printing unit 24. Given that the frame 302 is the first frame, the frame 303 corresponds to the second frame.

Both indices 32, 33 are marks indicating a possibility of occurrence of dot omission in the image 31 printed in the frame 302, and thus there is little need to print both. Therefore, as long as an index is printed in the N-th pass across the frame adjacently downstream of the current target frame, the print data generation unit 12*a*, even in a case of making the determination "Yes" in step S310 in FIG. 4, may execute step S340 without executing steps S320, S330 and end the flowchart in FIG. 4.

As described above, although both indices 32, 33 are marks related to the frame 302, according to FIGS. 5 and 6, the index 32 and the index 33 differ in position within the frame, shape, and design. If the indices 32, 33 were the same in position within the frame or in appearance, the user who visually recognizes the index 33 would not be able to determine whether the index 33 is a mark for the frame 302 or the frame 303. Therefore, the control unit 11 makes it easier to determine the frame related to the mark by making the positions within the frame and the appearances differ for the index 32 and the index 33. For example, when the index is a triangle and printed upstream within the frame as illustrated in FIG. 5, the index can be identified as a mark related to the image in the frame where the index is printed. On the other hand, when the index is a star and printed downstream within the frame as illustrated in FIG. 6, the index can be identified as a mark related to the image in the frame adjacently downstream of the frame where the index is printed.

When each frame transported downstream by the transport unit 17 passes under the irradiation unit 26, the frame is irradiated with ultraviolet light by the irradiation unit 26. Therefore, when the index is printed in the frame, the index is irradiated with ultraviolet light and emits light, making it possible for the user to visually recognize the index. In response to visually recognizing the index, the user views the image 31 of the frame related to the index and evaluates the presence or absence and the extent of dot omission and the like. The user may use the printed result as a product if the frame of the printed result indicated by the index is unproblematic in image quality, or may not use the printed result as a product if the frame is problematic in image quality. The index is printed with the special liquid and thus is not visible unless irradiated with ultraviolet light or is rendered invisible after the elapse of time or after the application of predetermined heat. This makes it possible to use a frame in which an index is printed as a product as well.

Alternatively, the printing apparatus 10 may include, downstream of the printing head 19, a sensor or a camera capable of detecting an index printed with the special liquid, and automatically detect the index in the transported frame by the sensor or camera. When the index is detected by the sensor or the camera in a certain frame, the user may visually evaluate the frame indicated by the detected index.

In this manner, according to the first exemplary embodiment, the control unit 11 prints an image by the ink in N passes per frame. In this case, when a new defective nozzle is detected after the start of printing in the first frame and before execution of the N-th pass, the special liquid ejection is performed along with the ink ejection in the N-th pass, printing the index in the first frame. On the other hand, when a new defective nozzle is detected in step S180 after execution of the N-th pass across the first frame, the index cannot be printed in the first frame, and thus the special liquid ejection is performed along with the ink ejection in the second frame, printing the index in the second frame.

3. Second Exemplary Embodiment

Next, a second exemplary embodiment will be described. In exemplary embodiments described below, including the second exemplary embodiment, descriptions common to those of the first exemplary embodiment will be omitted.

In the second exemplary embodiment, when the control unit 11 detects a new defective nozzle after the start of printing in the first frame and before the start of printing in the second frame, the special liquid ejection is performed along with the ink ejection in the second frame, printing the index in the second frame, regardless of whether the timing of detection of the new defective nozzle is before or after the N-th pass across the first frame. In other words, in the second exemplary embodiment, steps S130, S140, S150, S160 in the flowchart of FIG. 3 are not present.

In the execution of the flowchart of FIG. 3 with the frame 302 as the target frame, for example, the control unit 11 executes step S170 following step S120. Such a second exemplary embodiment is generally formulated based on the description related to FIG. 3 with the omission of steps S130, S140, S150, S160, and the descriptions related to FIG. 4 and FIG. 6. In the second exemplary embodiment, "Yes" in step S310 means that, in the flowchart of FIG. 3 when the frame 302 was the target frame, a new defective nozzle was detected in step S180 after any one pass of the first pass to the N-th pass across the frame 302, and the defective nozzle flag was switched to on in step S210. According to the second exemplary embodiment, it is possible to print the necessary index on the medium 30 by further simplifying the processing than in the first exemplary embodiment.

4. Third Exemplary Embodiment

Figure 7:
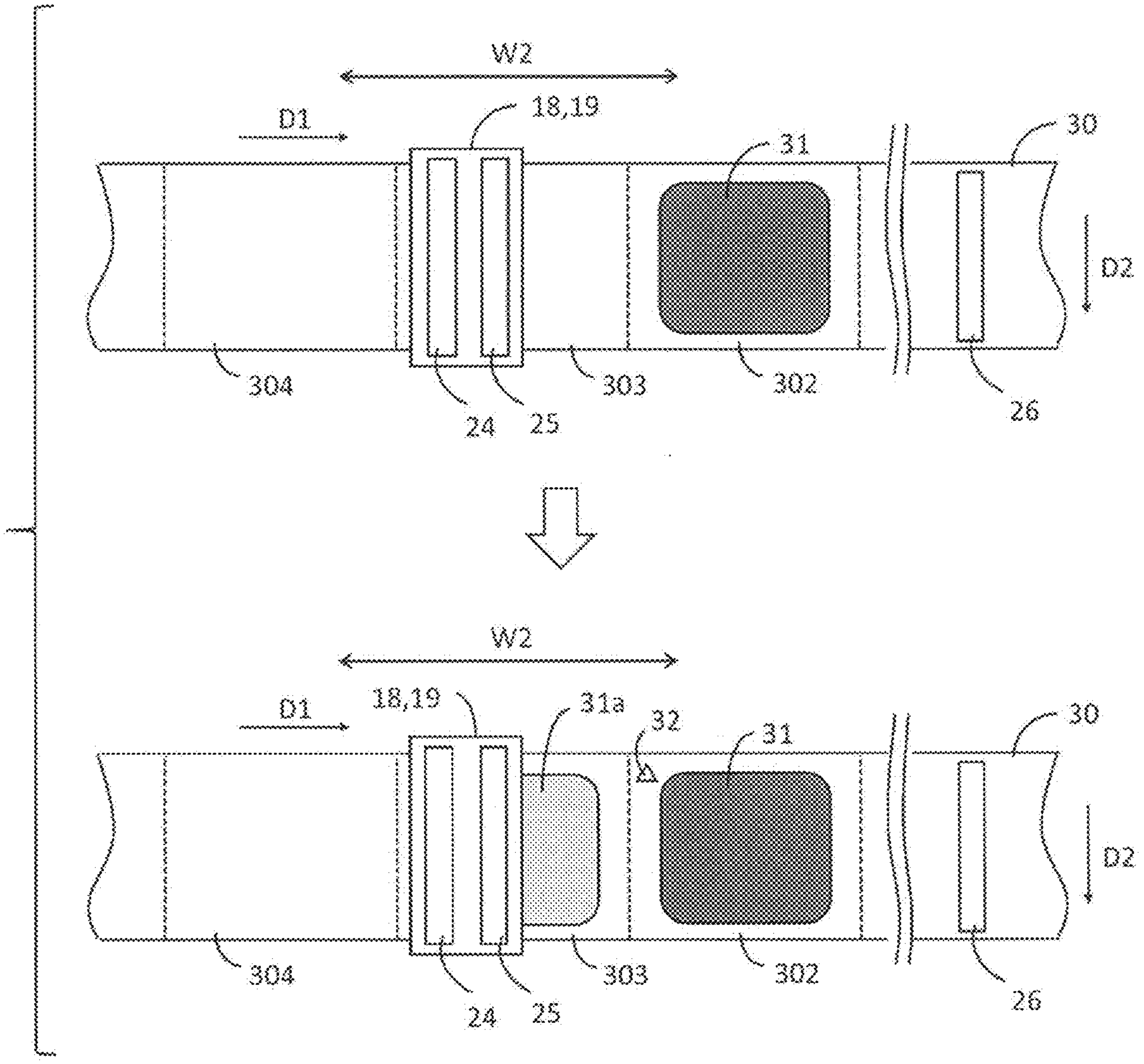
FIG. 7 is a drawing for explaining a specific example of a third exemplary embodiment.

FIG. 7 is a drawing for explaining a specific example of a third exemplary embodiment. The view of FIG. 7 is the same as the views of FIG. 5 and FIG. 6. In FIG. 7, the movable range of the carriage 18 parallel to the transport direction D1 is indicated as a movement range W2. In comparison to the movement range W1 illustrated in FIGS. 5 and 6, the movement range W2 is wide. That is, in the third exemplary embodiment, the printing head 19 can perform printing not only in the target frame but also in a partial range of the frame adjacently downstream of the target frame and a partial range of the frame adjacently upstream of the target frame while the medium 30 is stationary.

The third exemplary embodiment is the same as the first exemplary embodiment in that, when a new defective nozzle is detected after the start of printing in the first frame and before execution of the N-th pass, the index is printed in the first frame in the N-th pass. In the third exemplary embodiment, when the control unit 11 detects a new defective nozzle in step S180 after execution of the N-th pass across the first frame, the index is printed in the first frame while the second frame is the target frame.

The upper portion of FIG. 7, similarly to the lower portion of FIG. 5, illustrates a state in which the flowchart of FIG. 3 with the frame 302 as the target frame is completed, and the transport unit 17 completed transport of the medium 30 by an amount equivalent to one frame. According to the upper portion in FIG. 7, unlike the lower portion in FIG. 5, the index 32 is not printed in the frame 302.

The lower portion in FIG. 7, similarly to the lower portion in FIG. 6, illustrates a state in which at least one pass has been completed in the flowchart of FIG. 3 with the frame 303 as the target frame. According to the lower portion in FIG. 7, unlike the lower portion in FIG. 6, the index 32 is printed in the frame 302. In the example in FIG. 7, because the flowchart of FIG. 3 with the frame 302 as the target frame ends with the defective nozzle flag being on, the control unit 11 prints the index by step S170 concurrently carried out with step S330 in FIG. 4. In this case, the carriage 18 is caused to enter a portion of the frame 302 in a pass that prints the image 31*a* in the frame 303 that is the target frame, thereby printing the index 32 in the frame 302. In the example in FIG. 7, the index 32 is printed based on the index data generated in step S320. According to the third exemplary embodiment, even after the target frame is switched from the first frame to the second frame, the index related to the first frame can be printed in the first frame.

5. Fourth Exemplary Embodiment

In the description above, the second printing unit 25 is a portion of the printing head 19 together with the first printing unit 24, and is mounted onto the carriage 18. In the fourth exemplary embodiment, however, the second printing section 25 is not mounted onto the carriage 18. The second printing unit 25 is disposed in a predetermined position downstream of the printing head 19 that includes the first printing unit 24.

Figure 8:
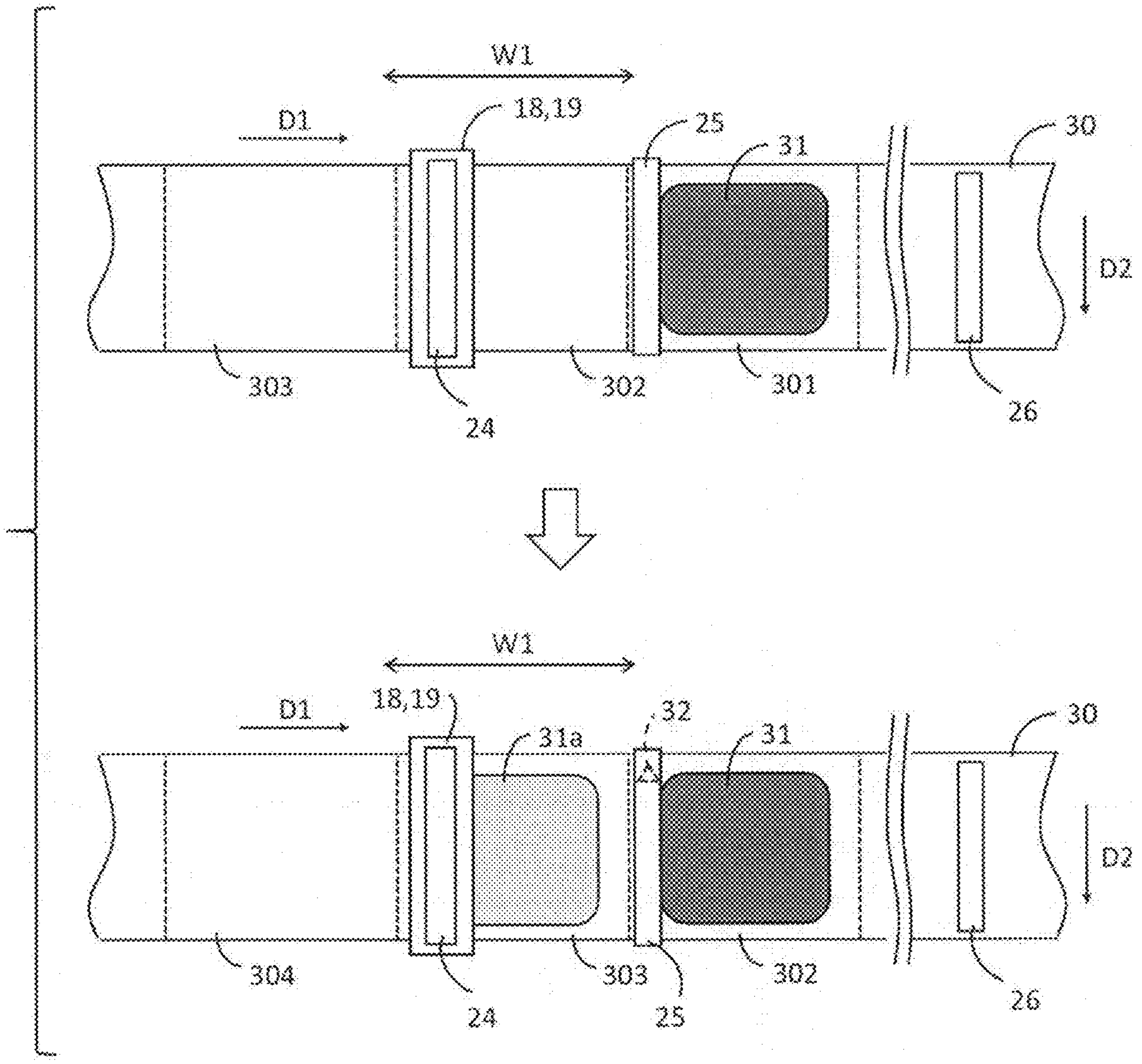
FIG. 8 is a drawing for explaining a specific example of a fourth exemplary embodiment.

FIG. 8 is a drawing for explaining a specific example of the fourth exemplary embodiment. The view of FIG. 8 is the same as the views of FIGS. 5 to 7. According to FIG. 8, the second printing unit 25 is positioned downstream of the carriage 18 and the printing head 19, and is fixed at a position that permits printing by the special liquid in the frame adjacently downstream of the target frame. Further, the second printing unit 25 is disposed upstream of the irradiation unit 26. In the fourth exemplary embodiment, the printing of the index by the second printing unit 25 is processing independent of the passes by the printing head 19. Therefore, the control unit 11 does not execute steps S130, S140, S150, S160 in the flowchart of FIG. 3 for the target frame. Then, step S330 in the flowchart in FIG. 4 refers to only the printing of the index by the second printing unit 25, and is not part of the pass by the printing head 19.

The upper portion in FIG. 8, similarly to the upper portions in FIGS. 5 and 6, illustrates a scenario at a time point in which the flowchart of FIG. 3 is about to start with the frame 302 as the target frame. Further, the lower portion in FIG. 8, similarly to the lower portions in FIGS. 6 and 7, illustrates a state in which at least one pass has been completed in the flowchart of FIG. 3 with the frame 303 as the target frame. According to the lower portion in FIG. 8, in parallel with the printing of the image 31*a* in the frame 303 by the flowchart in FIG. 3, the index 32 is printed by the second printing unit 25 in the frame 302 adjacently downstream of the frame 303 by the flowchart in FIG. 4. In FIG. 8, the index 32 printed at a position overlapping the second printing unit 25 is indicated by a dashed line. According to the fourth exemplary embodiment, the second printing unit 25 is disposed downstream of the first printing unit 24, independently of the printing head 19 of the first printing unit 24. In this way, the necessary index can be printed in a frame in which printing by the ink is already completed, independently of the printing by the ink in the target frame.

6. Fifth Exemplary Embodiment

The control unit 11 may print the mark, that is, the index, at a position in the first frame or the second frame, the position corresponding to, of raster lines in the first frame, a "defective raster line" printed using the nozzles 21 including one or more of the defective nozzles. Being printed with the nozzles 21 including one or more of the defective nozzles includes both a case in which printing is performed using only defective nozzles, that is, printing was substantially not performed due to dot omission, and a case in which printing was performed using both a defective nozzle and the normal nozzles 21. A fifth exemplary embodiment and a sixth exemplary embodiment described below can be combined with any of the exemplary embodiments.

Figure 9:
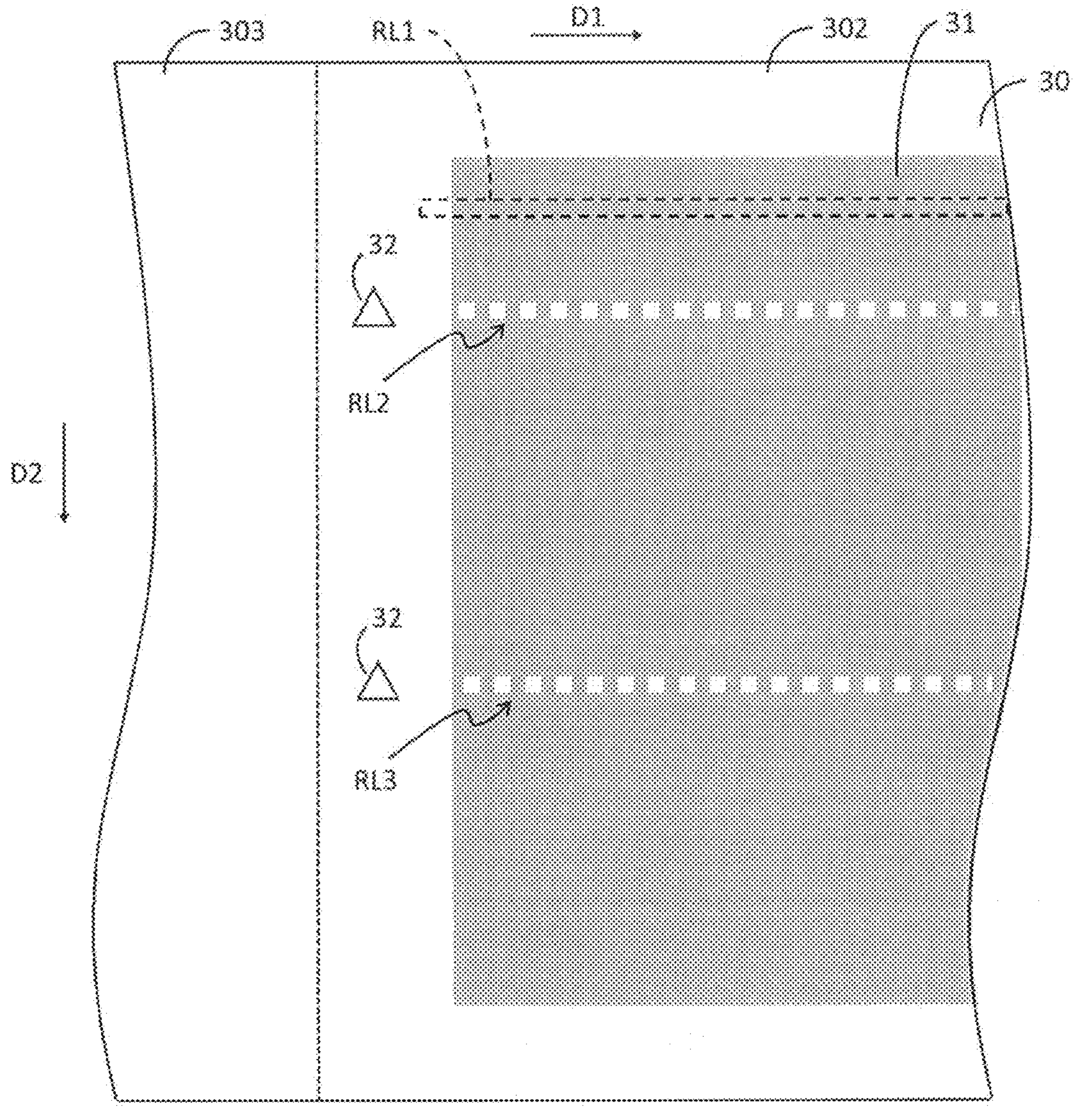
FIG. 9 is a drawing for explaining a specific example of a fifth embodiment.

FIG. 9 is a drawing for describing a specific example of the fifth exemplary embodiment, illustrating portions of the frame 302 and the frame 303 of the medium 30 further enlarged than in FIG. 5 and the like. In FIG. 9, in the frame 302, the image 31 is printed by N passes and the index 32 for the frame 302 is printed. The index for the frame 302 may, of course, be printed in the frame 303 rather than the frame 302. In FIG. 9, one raster line RL1 is surrounded by a dashed line. Further, FIG. 9 illustrates, in an easy-to-understand manner, several raster lines RL2, RL3 in the frame 302 that are printed with dot omissions. That is, in the flowchart of FIG. 3 executed with the frame 302 as the target frame, at least one or more passes of the N passes resulted in dot omissions in some raster lines RL2 and RL3 due to the occurrence of new defective nozzles before registration in the defective nozzle list for nozzle complementation. Such raster lines RL2, RL3 each correspond to the defective raster line.

As illustrated in FIG. 9, the control unit 11 prints the index 32 at each position corresponding to a defective raster line by the second printing unit 25. The position corresponding to the defective raster line is a position that matches or substantially matches the defective raster line in a direction intersecting a longitudinal direction of the raster line, that is, in the width direction D2 in the drawing. The control unit 11 need only specify the position corresponding to a defective raster line in accordance with the position of a new defective nozzle in the nozzle group 22C, 22M, 22Y, 22K, and cause the second printing unit 25 to print the index 32 with the special liquid in a specific position. In this manner, according to the fifth exemplary embodiment, the index is printed at a position corresponding to the defective raster line in the first frame or the second frame, making it possible for the user to easily recognize the position of the defective raster line in accordance with the index, and efficiently determine whether the image quality of the frame of the printed result is favorable.

7. Sixth Exemplary Embodiment

The control unit 11 may print, in the first frame or the second frame by the second printing unit 25 using the special liquid, character information indicating a position and/or a quantity of, of the raster lines in the first frame, a "defective raster line" printed using the plurality of nozzles 21 including one or more of the defective nozzles. The control unit 11 prints such character information along with the index with the special liquid at the timing of printing the index described above. The character information may be considered part of the index. The position of the defective raster line refers to, for example, of positions assigned in advance for each raster line in the width direction D2, the position corresponding to the defective raster line. Alternatively, a nozzle number may be treated as the position of the raster line.

Assume that the control unit 11 recognizes that, for example, the raster lines RL2, RL3 are defective raster lines as in FIG. 9 from the detection result of new defective nozzles in the flowchart of FIG. 3 with the frame 302 as the target frame. In such a situation, the control unit 11 prints, in the frame 302 or the frame 303, a string indicating one or both of information indicating the positions of the raster lines RL2, RL3, and information indicating "2" as the quantity, with the special liquid along with the index. According to such a sixth exemplary embodiment, the user can learn more detailed information about the defective raster lines by recognizing character information printed with the special liquid.

8. Summary

In this manner, according to the exemplary embodiment, the printing apparatus 10 includes the first printing unit 24 including the plurality of nozzles 21 configured to eject ink onto the medium 30, the second printing unit 25 configured to perform printing on the medium 30 using the special liquid, the defective nozzle detector 20 configured to detect a defective nozzle among the plurality of nozzles 21, and the control unit 11 configured to control the first printing unit 24 and the second printing unit 25. The special liquid is a liquid rendered invisible depending on an elapsed time after printing on the medium 30 or an environment in which the printed result on the medium 30 is visually recognized. The control unit 11 prints the specific mark by the second printing unit 25 using the special liquid in, of frames serving as printing unit regions of the medium 30, the first frame in which printing was performed by ejection of the ink with the defective nozzle included in the first printing unit 24, or the second frame subjected to printing by the first printing unit 24 following the first frame.

According to the configuration described above, an index that is the specific mark is printed with the special liquid in the first frame or the second frame. Accordingly, the user can evaluate the image quality of the first frame of the printed result in accordance with the index, and use the first frame and the second frame of the printed result as products with the index printed as is. That is, the user can avoid wasting resources such as the medium 30 and the ink by avoiding situations with the related art in which the printed result cannot be used as a product or the applicable range of use is limited due to the presence of inspection marks and the like. Further, according to the exemplary embodiment, the printing apparatus 10 uses, as the special liquid, a UV light-emitting ink that visually recognizably emits light when irradiated with the ultraviolet light. Then, the printing apparatus 10 includes the irradiation unit 26 configured to irradiate, with ultraviolet light, the region of the medium 30 where the mark is configured to be printed.

According to the configuration described above, it is possible to confirm the presence of the index by irradiating the medium 30 using the irradiation unit 26 and thus perform the required image quality evaluation, and make the index not visually recognizable in a normal state.

Further, according to the exemplary embodiment, the control unit 11 may print the mark at a position in the first frame or the second frame, the position corresponding to, of the raster lines in the first frame, a defective raster line printed using the plurality of nozzles 21 including one or more of the defective nozzles.

According to the configuration described above, the user can easily recognize the position of the defective raster line in accordance with the index, and can efficiently evaluate the image quality of the first frame of the printed result.

Further, according to the exemplary embodiment, the control unit 11 may print, in the first frame or the second frame by the second printing unit 25 using the special liquid, character information indicating a position and/or a quantity of, of the raster lines in the first frame, a defective raster line printed using the plurality of nozzles 21 including one or more of the defective nozzles.

According to the configuration described above, the user can learn more detailed information about defective raster lines by recognizing the character information printed with the special liquid, and use this information to evaluate the image quality.

The exemplary embodiment is not limited to an apparatus or a system, and also discloses various categories of the disclosure, such as a method executed by an apparatus or a system, and the program 12 that causes a processor to execute a method.

The exemplary embodiment discloses, for example, a printing method by the printing apparatus 10 including the first printing unit 24 including the plurality of nozzles 21 configured to eject ink onto the medium 30. The printing apparatus 10 includes the second printing unit 25 configured to perform printing on the medium 30 using a special liquid, the special liquid being a liquid rendered invisible depending on an elapsed time after printing on the medium 30 or an environment in which the printed result of the medium 30 is visually recognized. Then, the printing method includes a first printing step for performing printing in frames serving as printing unit regions of the medium 30 by ejecting the ink by the first printing unit 24, a defective nozzle detecting step for detecting a defective nozzle among the plurality of nozzles 21, and a second printing step for printing the specific mark by the second printing unit 25 using the special liquid in, of the frames, the first frame in which printing was performed by ejection of the ink with the defective nozzle included in the first printing unit 24, or the second frame subjected to printing by the first printing unit 24 following the first frame.

According to FIGS. 3 and 4, step 170 corresponds to the first printing step. Further, step S330 and a portion of step S170 correspond to the second printing step, and step S180 corresponds to the defective nozzle detecting step.

The second printing unit 25 need only to be configured to execute printing with the special liquid, and thus is not limited to being configured to eject the special liquid using the nozzles 21. For example, the second printing unit 25 may be a stamp movable under the control of the control unit 11, or may print the index by coming into contact with the medium 30 and causing the special liquid to adhere to the medium 30.

The medium 30 need not be a medium in which a plurality of frames are joined together, such as the roll paper indicated in FIG. 5 and the like. The medium 30 may be a cut sheet cut into single sheet units, or the like. In this case, one cut sheet corresponds to one frame, and the transport unit 17 need only transport a plurality of the cut sheets continuously.

The printing apparatus 10 is capable of executing so-called cleaning in which the function of the printing head 19 is restored at a desired timing. With the cleaning, clogs are removed from the nozzles 21, returning the defective nozzles to normal. Accordingly, when the cleaning of the printing head 19 is executed, the control unit 11 may initialize the defective nozzle list by deleting the registration of the defective nozzles in the defective nozzle list.

What is claimed is:

1. A printing apparatus comprising:

a first printing unit including a plurality of nozzles configured to eject ink onto a medium;

a second printing unit configured to perform printing on the medium using a special liquid;

a defective nozzle detector configured to detect a defective nozzle among the plurality of nozzles; and a control unit configured to control the first printing unit and the second printing unit, wherein the special liquid is a liquid rendered invisible depending on an elapsed time after printing on the medium or an environment in which a printed result on the medium is visually recognized and the control unit prints a specific mark by the second printing unit using the special liquid in, of frames serving as printing unit regions of the medium, a first frame in which printing was performed by ejection of the ink with the defective nozzle included in the first printing unit, or a second frame subjected to printing by the first printing unit following the first frame.

2. The printing apparatus according to claim 1, further comprising:

an irradiation unit configured to irradiate, with ultraviolet light, a region of the medium where the mark is configured to be printed, wherein the special liquid is a UV light-emitting ink that visually recognizably emits light when irradiated with the ultraviolet light.

3. The printing apparatus according to claim 1, wherein the control unit prints the mark at a position in the first frame or the second frame, the position corresponding to, of raster lines in the first frame, a defective raster line printed using the plurality of nozzles including one or more of the defective nozzles.

4. The printing apparatus according to claim 1, wherein the control unit prints, in the first frame or the second frame by the second printing unit using the special liquid, character information indicating a position and/or a quantity of, of raster lines in the first frame, a defective raster line printed using the plurality of nozzles including one or more of the defective nozzles.

5. A printing method by a printing apparatus, the printing apparatus including:

a first printing unit including a plurality of nozzles configured to eject ink onto a medium and a second printing unit configured to perform printing on the medium using a special liquid, the special liquid being a liquid rendered invisible depending on an elapsed time after printing on the medium or an environment in which a printed result on the medium is visually recognized, the printing method comprising:

a first printing step for performing printing in frames serving as printing unit regions of the medium by ejecting the ink by the first printing unit;

a defective nozzle detecting step for detecting a defective nozzle among the plurality of nozzles; and a second printing step for printing a specific mark by the second printing unit using the special liquid in, of the frames, a first frame in which printing was performed by ejection of the ink with the defective nozzle included in the first printing unit, or a second frame subjected to printing by the first printing unit following the first frame.

* * * * *